Oct. 13, 1964  A. J. SERGAN  3,152,488
TORQUE DRIVE UNIT
Filed June 12, 1962  5 Sheets-Sheet 1
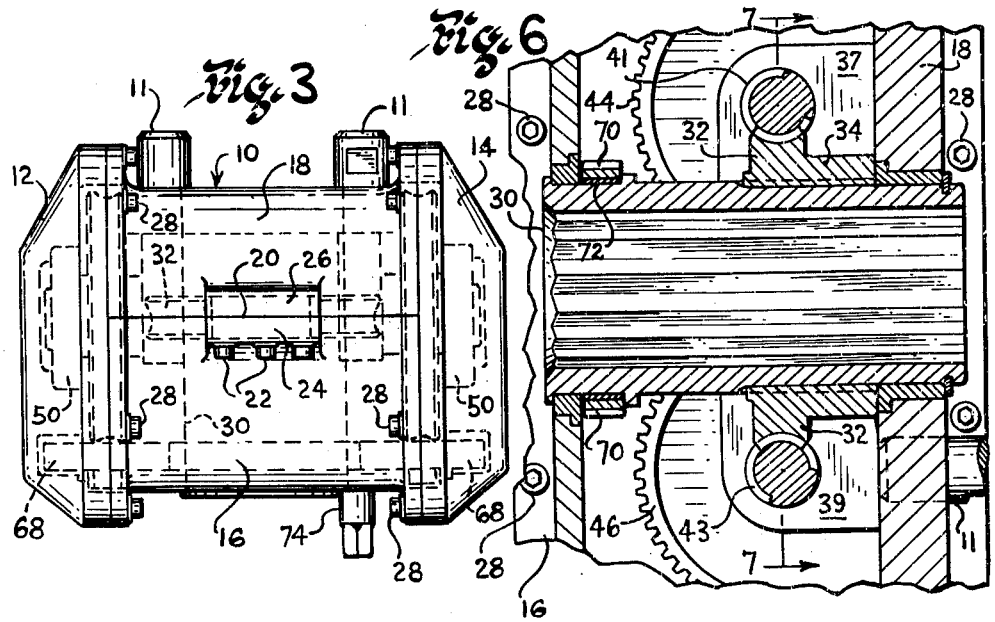
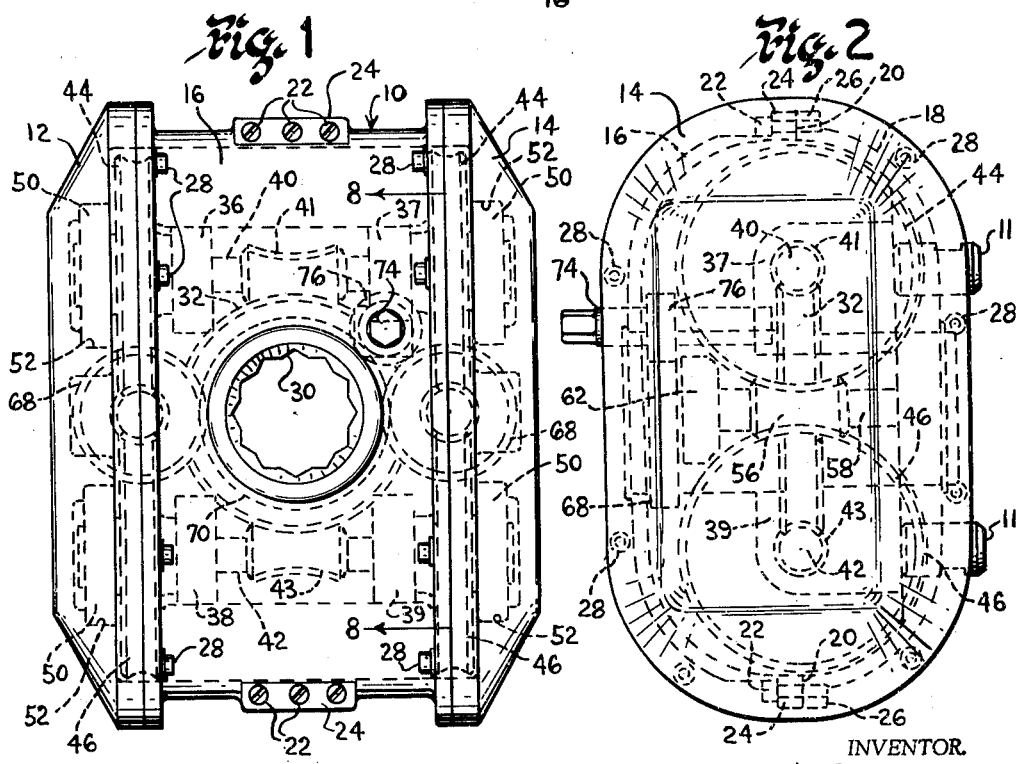
INVENTOR.
ANTHONY J. SERGAN
BY
Steward & Steward
ATTORNEYS

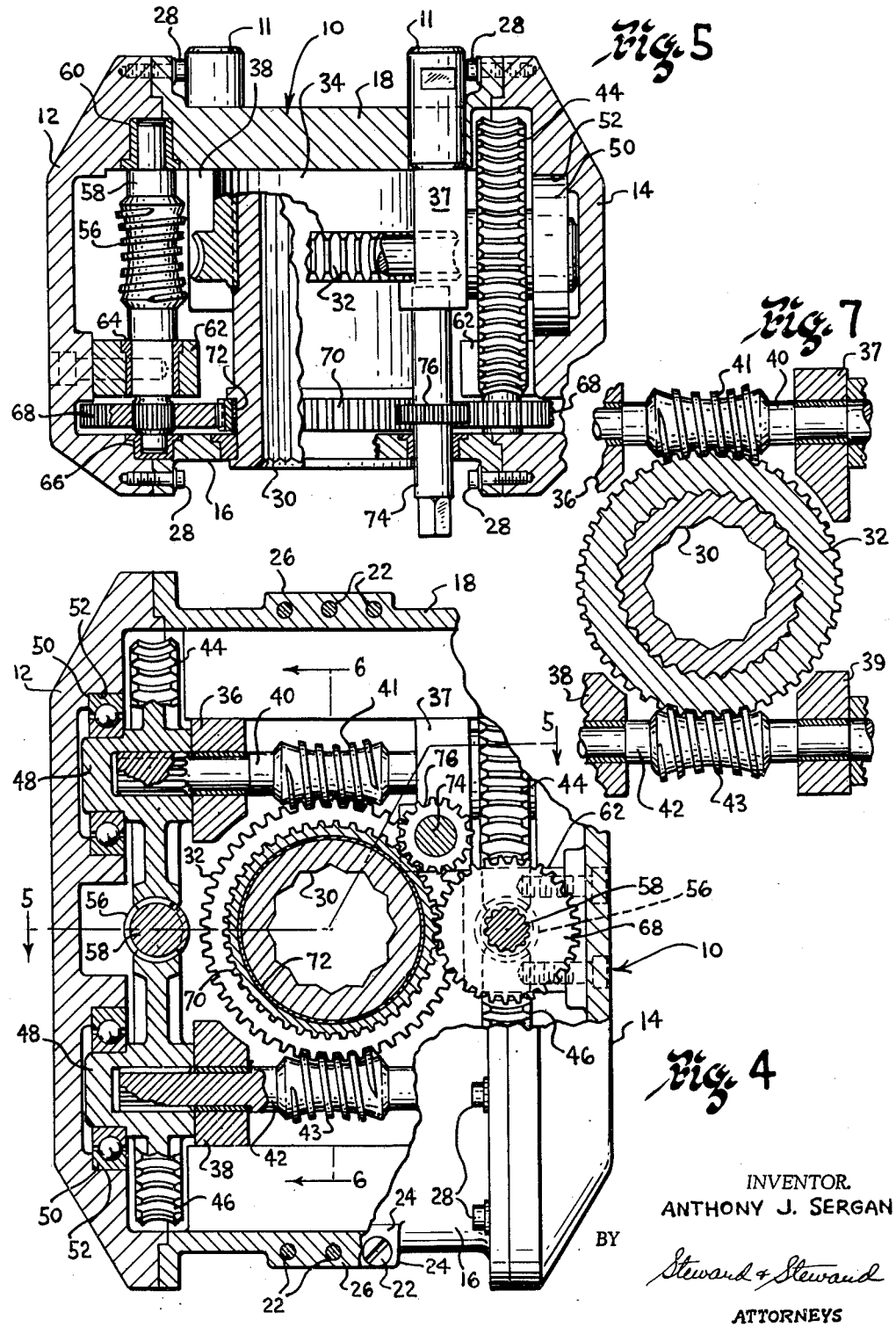

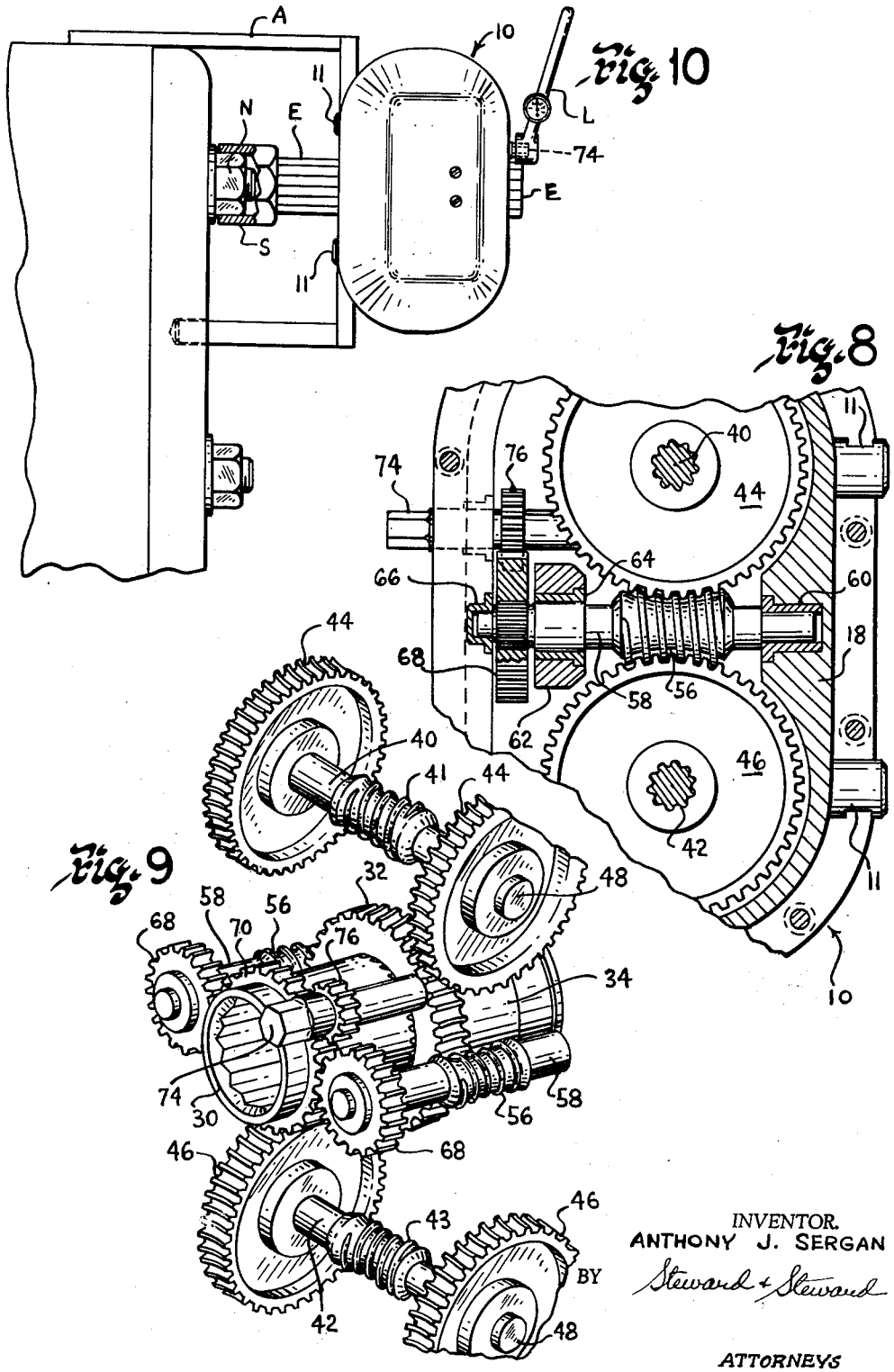

Oct. 13, 1964     A. J. SERGAN     3,152,488
TORQUE DRIVE UNIT

Filed June 12, 1962     5 Sheets-Sheet 4

INVENTOR.
ANTHONY J. SERGAN
BY Steward & Steward

ATTORNEYS

Oct. 13, 1964 A. J. SERGAN 3,152,488
TORQUE DRIVE UNIT
Filed June 12, 1962 5 Sheets-Sheet 5

INVENTOR.
ANTHONY J. SERGAN
BY Steward & Steward
ATTORNEYS

United States Patent Office 3,152,488
Patented Oct. 13, 1964

3,152,488
TORQUE DRIVE UNIT
Anthony J. Sergan, 52 Lenti Terrace, Glastonbury, Conn.
Filed June 12, 1962, Ser. No. 201,970
9 Claims. (Cl. 74—427)

This invention relates to torque amplifying devices and particularly to such devices capable of producing radially balanced torque output in a drive member from input torque applied eccentrically of such member.

In my earlier Patents Nos. 2,890,612 and 2,961,904 I have disclosed several constructions for hydraulic wrenches designed to apply torque uniformly. Both of those earlier devices operate in a step-wise manner and it is accordingly one of the objects of this invention to provide devices capable of producing balanced torque of high moment continuously in either direction of rotation.

In many practical applications, the torquing or tightening of a member such as a nut or bolt must be done very accurately in order to avoid uneven strain on the member. This uneven strain may cause localized overstressing of the member, resulting in failure under load. The uneven application of torque may also cause dimensional distortion of a member which distortion, although of such small magnitude as seemingly to be relatively insignificant, will nevertheless be very important and even destructive of the component or related components under certain conditions. For example, the improper application of torque to impeller shaft nuts on high speed turbine engines may result in dynamic unbalance at the very high shaft speeds at which such equipment normally operates. So also, excessive friction between threaded members may develop during tightening if the torque applied is unbalanced radially of the members, making for inaccuracy in achieving a desired torque value. Inaccurate torque application can also be especially serious when a member, such as a bolt subject to differential thermal expansion, is to be tightened to a maximum safe value.

It is accordingly an object of the present invention to provide a device which facilitates the continuous, uniform application of torque forces whereby the inaccuracies, distortions and friction mentioned above are eliminated. It is a further object to do this by a simple yet high efficient unit of practical size, minimum complexity and minimum cost, having very high torque amplifying capability.

Devices of the invention may take specifically different forms, but in general they comprise a gear drive unit capable of selectively producing continuous turning moment or torque in either direction of rotation. The devices may constitute a part of stationary equipment, such as winches for hoisting heavy equipment, for example sonar units and ship anchors, or for extracting mired vehicles such as ordnance equipment; or they may form a part of power actuators for opening and closing large hydraulic or pneumatic valves, gates or bulkhead doors and the like. A more common use, however, is as a power wrench for accurately torquing nuts or bolts in such different fields as engines and motors, machine tools, aircraft frame members, bridge elements, and building structures.

Several specific devices embodying the invention are shown in the accompanying drawings. Such embodiments are obviously illustrative rather than limiting, and are to be so regarded in considering the description which follows. From these it will be apparent that various changes in specific components may be made without departing from the inventive concept as defined in the claims.

With reference to the accompanying drawings,

FIG. 1 is a front elevational view of a preferred form of device designed more particularly to serve as a power wrench;

FIG. 2 is a side elevational view of the same;

FIG. 3 is a plan view looking from the top in FIGS. 1 and 2;

FIG. 4 is similar to FIG. 1, slightly enlarged, with parts being broken away and in section to illustrate the interior of the device;

FIG. 5 is a sectional view on line 5—5 of FIG. 4;

FIG. 6 is a partial view in section, taken on line 6—6 of FIG. 4;

FIG. 7 is a fragmentary sectional view on line 7—7 of FIG. 6;

FIG. 8 is a fragmentary view corresponding generally to FIG. 2 but on a somewhat larger scale;

FIG. 9 is an exploded view illustrating schematically the gear train;

FIG. 10 is a view showing the device of FIG. 1 in typical use;

Figure 11:
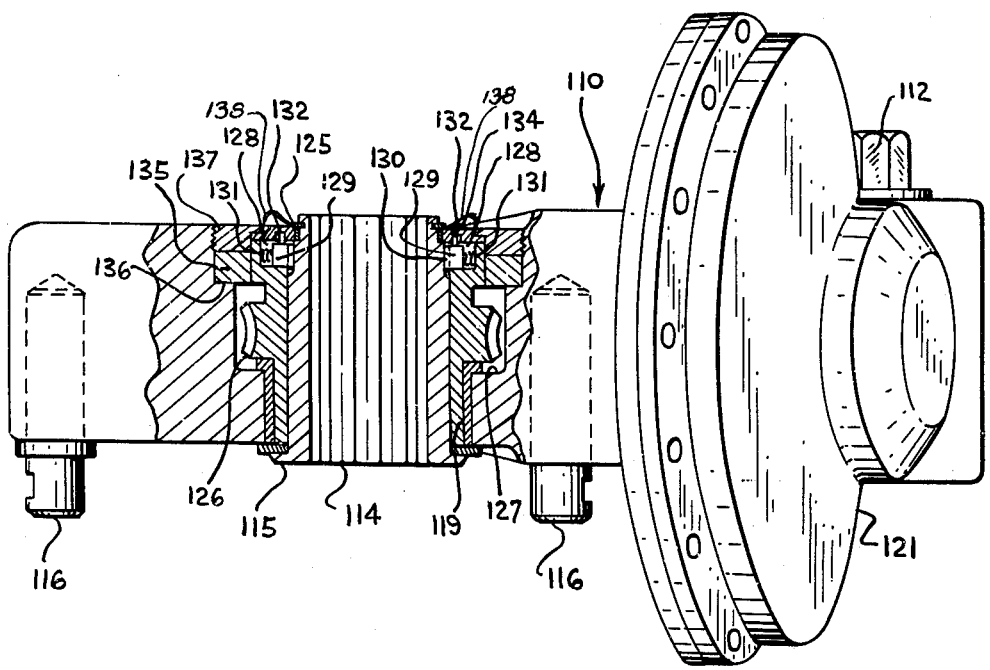
FIG. 11 is a side view of an alternative form of the invention.

A somewhat simplified representation of the device in operating position is shown in FIG. 10, wherein torque unit 10 is fitted with a conventional hex extension shaft E equipped with an interchangeable socket S of appropriate size for engaging a nut N of the member to be tightened. Torque unit 10 is supported adjacent the nut by shear lugs 11 which are received in a conventional adapter A temporarily attached to the body of the member on which nut N is located. Adapter A serves to counter the torque reaction on unit 10 as the nut is tightened. In the illustration, input turning moment for unit 10 is provided by an indicator-equipped torquemeter bar or lever L having a suitable hexagonal socket for engagement of the input shaft of unit 10, as more fully described hereinafter. Obviously torquemeter bar L could be replaced by a torque calibrated electric or hydraulic motor.

Referring now to FIGS. 1, 2 and 3, torque unit 10 includes a housing comprising left and right end caps 12, 14 and semielliptical front and rear frame sections 16, 18. These front and rear sections meet at a partline 20 (see FIG. 3) substantially midway of the depth of the unit, and are secured together at their upper and lower edges by machine screws 22 passing through apertured bosses 24 in frame section 16 into threaded engagement with apertures in complementary bosses 26 of frame section 18. Frame sections 16, 18 are flanged about their lateral peripheries and end caps 12, 14 are secured to the flanges by screws 28 to close the sides of the unit.

The housing thus provided centrally supports the output or drive member 30 which extends through the unit perpendicular to the front and rear faces, and is journaled at its opposite ends in suitable radial and thrust bearings provided in the respective frame sections 16, 18. Drive member 30 in this instance comprises a sleeve forming a conventional double-hex socket for reception of the usual drive extension E, as illustrated in FIG. 10. Drive member 30 is provided on its exterior with a peripheral worm gear 32 disposed intermediate its ends, as seen more particularly in FIGS. 5 and 6. In the embodiment illusrated in FIGS. 1 to 9 worm gear 32 is permanently splined to the drive member, although obviously a reversible ratcheting arrangement could be provided for preliminary take-up of the nut or bolt prior to actual tightening. Worm gear 32 has an axially extending hub 34 by which the gear teeth are spaced forwardly of the rear wall of frame section 18, and hub 34 acts as a thrust bearing in cooperation with the wall. This same wall is provided with paired sets of pillow blocks or bearing supports 36, 37 and 38, 39 (FIG. 4) secured by suitable screw means, and these supports project interiorly of the unit, axially of drive member 30, in spaced relation about the latter.

As seen in FIGS 4 and 5, blocks 36, 37 rotatably support countershaft 40 above member 30, while blocks 38, 39 support countershaft 42 beneath it, so that these two shafts straddle drive member 30, parallel to each other, in a plane perpendicular to that member at about its midpoint. Shafts 40 and 42 are formed intermediate their ends, respectively, to provide a first pair of worms 41, 43 which are in meshing engagement with drive worm gear 32 at diametrically opposite points. Shafts 40 and 42 project through bearing blocks 36, 37 and 38, 39, respectively, where they are journaled in suitable sleeve bearings, and each shaft has two worm gears splined thereon, straddling the worms 41, 43. Thus, shaft 40 carries a first set of worm gears 44, 44, while shaft 42 carries a second set of worm gears 46, 46. In the arrangement illustrated, a gear 44, 46 each have projecting hubs 48 received in the inner race of ball bearings 50 carried in sockets or recesses 52 in end caps 12, 14. Thus, gears 44, 46 are supported in bearings immediately adjacent each side thereof which serves to maintain rigid alignment of the gears and prevent "whipping" of the ends of the shafts imposed by loading on the gears in use. The gears are, as already mentioned, splined or otherwise secured to the respective shafts 40, 42 to drive the same and the worms 41, 43 thereon, and through the latter to drive worm gear 32 and member 30.

Coupled gears 44–46, 44–46, are driven, in turn, by a second pair of worms 56, 56, formed integrally on shafts 58, 58. That is, shafts 58 and worms 56 are disposed intermediate the respective pairs of gear 44—46, 44–46, extending perpendicular to shafts 40, 42 and consequently parallel to drive member 30. Each of shafts 58 is reduced in diameter adjacent its ends (see FIG. 5) to provide shoulders. Shafts 58 are supported at the rear (top as viewed in FIG. 5) in sleeve bearings 60 carried in rear wall 18 and abutting the rear shoulder of the shafts. These shafts are supported forwardly of worms 56 in additional bearing blocks 62 which also carry sleeve bearings 64 abutting the forward shoulders of shafts 58. And the forward projections of these shafts are carried in turn in a third set of bearings 66 in front housing 16, for the same reason already explained in connection with shafts 40, 42.

The gearing and connecting shafts so far described comprise an endless gear train immediately surrounding the drive worm gear 32 and drive member 30. This inner gear train thus consists of a first pair of gear members 41, 43, which mesh with drive worm gear 32, and also includes the respective countershafts 40, 42 with which they are fast. Also included in this inner train are the two sets of paired gears 44—46, 44—46, and the intermediate worms 56, 56 and their respective shafts To provide torque input to said inner gear train, each shaft 58 has splined to it a pinion 68 which is carried between bearings 64, 66. These pinions in turn each engage a ring gear 70 which is journaled in a sleeve bearing 72 (FIG. 6) for free rotation on drive member 30, this engagement being disposed at diametrically opposite points on the ring gear. Thus ring gear 70 and pinions 68 complete a second or outer endless gear train which includes the inner train previously described.

Input torque to unit 10 is supplied through shaft 74 having a hex end projecting through the front face of frame member 16 for engagement by a torquemeter lever or other drive member as already explained. Shaft 74 is supported at its rear end in a bearing recess in block 37 (FIG. 5) and is provided intermediate its ends with a pinion 76 splined thereto which meshes with ring gear 70 carried on drive member 30.

The complete inner and outer gear trains through which drive member 30 is turned by the input torque applied to shaft 74 are illustrated in FIG. 9. Referring to this figure, torque applied to shaft 74 causes rotation of pinion 76 which, by meshing engagement with ring gear 70, causes the latter to turn. Ring gear 70 is journaled for rotation on drive 30, independently thereof, and its rotation drives pinions 68, 68 in the same direction. Each pinion 68 drives its corresponding shaft 58 and worm 56 secured thereto. Worms 56, meshing with paired worm gears 44, 46 at each side of the unit, drive those gears in opposite directions. This results in opposite directions of rotation in shafts 40, 42, and consequently worm 41 turns in the opposite direction from worm 43. Since these worms mesh with worm gear 32 of drive member 30 at diametrically opposite points, the worms cooperate to drive the latter member in the same direction.

The foregoing arrangement produces a balanced torque providing mechanical "feed-back" through the paralleling or pairing of gear components and the disposition of the elements of these gear couples on axially opposite sides of the central drive member. Axial displacement of the drive member is thus minimized, as are also adverse frictional forces which may be encountered.

Figure 12:
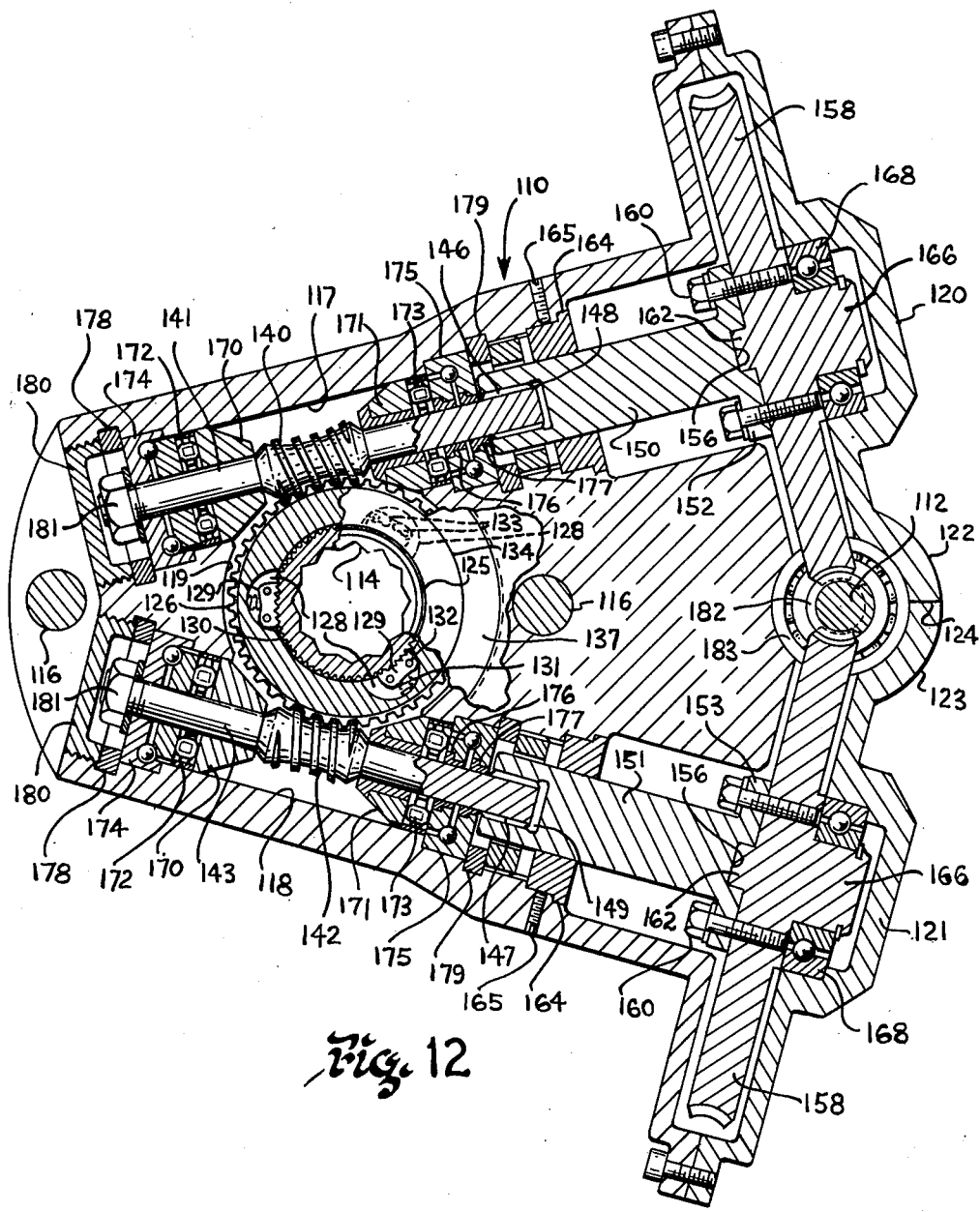
FIG. 12 is a plan view in section on line 12—12 of FIG. 11.

A modified form of the device is shown in FIGS. 11 and 12 wherein unit 110 is of roughly triangular form as viewed in plan, having an input shaft 112 and an output drive member 114. As in the above-described modification, output drive member 114 is a double hexagonal splined socket for the reception of a male drive extension of conventional form. Unit 110 is further provided with shear studs 116 for supporting the drive unit upon a conventional adapter (similar to that shown in FIG. 10) temporarily secured to the device to which the torque is to be applied.

Unit 110 comprises an integral casting or forging lined bored at 117, 118 in the general plane of the unit, and transversely of the plane thereof at 119. End caps 120, 121 of generally circular configuration are received over the right hand open ends of bores 117, 118, respectively, as seen in the drawings. These caps are formed at one point on their peripheries with adjacent hollow bosses 122, 123 which meet along a part line 124 and together form a semicylindrical housing, as best seen in FIG. 12. Drive member 114 is journaled in bore 119 and retained against axial shifting by an external collar 115 at its inner end, and by a split ring 125 received in peripheral recess of member 114 adjacent its opposite (outer) end.

As before, drive member 114 carries a worm gear 126 intermediate its axial extent within the body of unit 110. A counterbore 127 in unit 110 receives gear 126 which in this instance is journaled on drive 114 for rotation independently thereof. Pockets 128 are formed at spaced intervals about gear 126, intersecting the end and inner peripheral faces thereof, and pawls 129 are located in these pockets. The periphery of member 114 adjacent the pawls is serrated to provide ratchet teeth 130 with which the similarly serrated adjacent surfaces of pawls 129 are normally held in engagement by a spring 131 and/or abutment of the back of the pawl against the wall of its pocket 128. The pawls are provided with paired pins 132 which project at the end faces thereof and are received in complementary paired detent recesses 133 formed in a ratchet shift ring 134. Split ring 125 retains shift ring 134 on member 114. Rotation of ring 134 causes pawls 129 to be toggled over center from one position to the other in pockets 128 to permit ratcheting of member 114 in one direction of rotation or the other for fast take-up of a bolt or nut preliminarily to tightening the same.

A front bearing 135 for member 114 is seated in counterbore 127 against a shoulder 136. Bearing 135 is retained in position by a threaded collar 137 received in the front face of the unit.

Turning or driving force is applied to worm gear 126 at substantially diametrically opposite points by worms 140, 142 which in this instance are shown as formed integrally on shafts 141, 143, respectively. Shafts 141, 143 are journaled in suitable bearings, presently to be described, disposed in bores 117, 118. The axes of these bores are inclined so that the projection of shafts 141, 142 intersect to form an included angle of 30°. At their divergent ends, shafts 141, 143 are splined at 146, 147 and are received in complementary splined sockets 148, 149 of extension shafts 150, 151. The latter in turn are formed with external flanges 152, 153 at their outer ends. These same ends are likewise slotted at 156. Each extension shaft 150, 151 is secured to a worm gear 158 by screws 160, and a pilot 162 on the hub of the gears mates with slot 156 in the ends of the respective extension shafts. The inner ends of extension shafts 150, 151 are journaled in bearings 164 which are retained in the bores 117, 118 by set screws 165. A hub 166 on each of worm gears 158 is received in ball-bearing assemblies 168 and the bearings are in turn supported in suitable recesses provided in end caps 122, 124.

Both radial and axial thrust bearings are provided at each end of worm shafts 141, 143, and since the construction of both are identical, description of one will suffice. Thus, worm shaft 141 is received in thrust cone bearings 170, 171 which abut axially against respectively opposite shoulders of worm 142. In this instance inner bearing 171 is split to permit assembly over splines 146 at its end of the shaft. Each cone bearing is backed by axial thrust bearings 172, 173. The latter in turn are backed by radial thrust bearings 174, 175. Again, the inner race of inner thrust bearing 175 is provided with split bushings 176, 177 to permit assembly over the splined end of 146 of the shaft. Finally, the bearing assemblies are locked in position adjacent the opposite ends of the shaft by split or snap rings 178, 179. A cap screw 180 is threadedly engaged in the outer end of the shaft bore, and this screw provides a take-up adjustment for its bearing assembly by engagement with ring 178. Similar take-up provision on the shaft is furnished by nut 181 on the end of the shaft. Nut 181 shoulders against the outer race of bearing 174 to provide take-up adjustment.

In the gear train of unit 110, each of worm gears 158 engages an intermediate worm 182 formed on input shaft 112. The latter is supported at its opposite ends in bearings 182 located in corresponding recesses in the complementary bosses 120, 121 and the body of unit 110. Rotation of shaft 112 and its corresponding worm 182 thus causes opposite rotation of gears 158 and opposite clock rotation of shafts 150, 141, in contrast to shafts 151, 143. This in turn produces opposite clock rotation of worms 140 and 142 which, being located on diametrically opposite sides of worm gear 126 produces similar turning moment on that gear and consequently on output drive member 114.

In both forms of the invention specifically described, balanced torque is obtained in the output member together with substantial magnification of turning moment. While the devices are capable of very substantial torque output, this is achieved through a novel design incorporating fewer components than in similarly rated prior devices heretofore. It will be obvious that various changes and other modifications may be made in the device described by those skilled in the art, without departing from the scope and intent of the invention, and such of these as fall within the scope of the claims which follow are intended to be covered.

What is claimed is:

1. In a device for producing a radially balanced torque output in a rotatable drive member from an eccentrically applied input torque, the combination which comprises
    said drive member for supplying output torque;
    a housing in which said drive member is journaled;
    a drive worm gear on said drive member, coaxial therewith and having driving connection thereto;
    an inner endless gear train and an outer endless gear train which includes said inner train;
    said inner train comprising a first pair of gear members in meshing engagement with said drive worm gear at substantially diametrically spaced points about the periphery thereof, two sets of coupled gears with the gears in each set being drivingly connected to opposite sides of the respective gears in said first pair of gear members, intermediate coupling gear means for driving, respectively, said coupled gears in said sets to produce opposite hand rotation of the respectively coupled gears;
    said outer endless gear train comprising additional gear means interconnecting said intermediate coupling gear means and producing rotation of the latter in the same direction;
    said outer train including means for transmitting torque input to said device at a point in said outer gear train between said intermediate gear coupling means.

2. A device as defined in claim 1, wherein in said inner gear train, said first pair of gear members comprises worms, and said intermediate coupling gear means comprises a second pair of worms, said worms in each pair being spaced in alteration about the periphery of said drive member with the axes of the first pair perpendicular to the longitudinal axis of said drive member and the axes of said second pair parallel thereto.

3. A device as defined in claim 2, wherein every gear element in said inner gear train is journaled in bearings immediately adjacent each side of each element to inhibit axial and radial displacement thereof.

4. A device as defined in claim 1, wherein said drive worm gear is mounted on said drive member intermediate the axial extent thereof.

5. A device as defined in claim 4, wherein said drive worm gear is provided with an integral collar extending axially of said drive member into abutment with a wall of said housing and providing a thrust bearing for said drive member.

6. A device as defined in claim 1, wherein said outer gear train includes a ring gear journaled on said drive member for rotation independently thereof, pinions meshing with said ring gear at diametrically opposite points thereon, and shafts fast with said pinions providing driving connection to said intermediate gear coupling means, respectively, said means for transmitting input torque to said device including said ring gear.

7. A device as defined in claim 1, wherein said driving connection between said drive worm gear and drive member comprises rachet and reversible pawl means formed on adjacent surfaces of said worm gear and drive member, respectively.

8. In a device for producing a radially balanced torque output in a drive member from an eccentrically applied input torque, the combination which comprises said drive member, a housing in which said member is journaled, and a worm gear on said member coaxial therewith and having driving connection thereto, a first shaft journaled in said housing and extending parallel to the axis of said drive member laterally thereof through which input torque is applied, a worm secured to said shaft, a pair of worm gears disposed on opposite sides of said shaft and meshing with said worm, countershafts journaled in said housing on which said worm gears are respectively secured, said countershafts lying in a plane perpendicular to the axis of said drive member, said shafts converging at their ends opposite said worm gears to form a V-configuration, said drive member lying in the crotch of said V-configuration, said countershafts each having a driving worm secured thereon meshing with said drive member worm gear.

9. A device as defined in claim 8, wherein said drive member is composed of concentric sleeves journaled one within the other and formed to provide radially spaced portions of short axial extent; one of said sleeves having toothed serrations about the periphery of its radially spaced portion, the other having a reversible pawl for engaging said serrations, and pawl reversing means to control the ratcheting direction of said drive member.

References Cited in the file of this patent

UNITED STATES PATENTS

| | | |
|---|---|---|
| 45,540 | Tooker | Dec. 20, 1864 |
| 1,369,442 | Kauffman | Feb. 29, 1921 |
| 1,384,662 | Hatcher et al. | July 12, 1921 |
| 1,618,927 | Hatcher | Feb. 22, 1927 |
| 2,686,582 | Odlum et al. | Aug. 17, 1954 |

FOREIGN PATENTS

| | | |
|---|---|---|
| 840,264 | France | Apr. 21, 1939 |
| 555,961 | Great Britain | Sept. 14, 1945 |